US008704643B2

(12) United States Patent
Bates et al.

(10) Patent No.: US 8,704,643 B2
(45) Date of Patent: Apr. 22, 2014

(54) CONVENIENT AND EASY TO USE BUTTON LAYOUT FOR A REMOTE CONTROL

(75) Inventors: Mathew Bates, Blackrock (IE); Alex Zaliauskas, Ontario (CA); Barbara Glover, Toronto (CA)

(73) Assignee: Logitech Europe S.A., Lausanne (CH)

( * ) Notice: Subject to any disclaimer, the term of this patent is extended or adjusted under 35 U.S.C. 154(b) by 543 days.

(21) Appl. No.: 12/239,437

(22) Filed: Sep. 26, 2008

(65) Prior Publication Data

US 2009/0224955 A1 Sep. 10, 2009

Related U.S. Application Data

(63) Continuation of application No. 11/841,778, filed on Aug. 20, 2007, which is a continuation of application No. 10/839,970, filed on May 5, 2004, now Pat. No. 7,612,685, which is a continuation of application No. 09/804,623, filed on Mar. 12, 2001, now abandoned, application No. 12/239,437, which is a continuation of application No. 11/841,748, filed on Aug. 20, 2007, which is a continuation of application No. 10/870,339, filed on Jun. 16, 2004, now Pat. No. 8,026,789, which is a continuation of application No. 09/804,718, filed on Mar. 12, 2001, now Pat. No. 6,784,805, application No. 12/239,437, which is a continuation of application No. 11/408,440, filed on Apr. 20, 2006, now Pat. No. 8,509,400.

(60) Provisional application No. 60/976,074, filed on Sep. 28, 2007, provisional application No. 60/189,487, filed on Mar. 15, 2000, provisional application No. 60/253,727, filed on Nov. 29, 2000, provisional application No. 60/189,487, filed on Mar. 15, 2000, provisional application No. 60/673,479, filed on Apr. 20, 2005.

(51) Int. Cl.
*G05B 11/01* (2006.01)

(52) U.S. Cl.
USPC .......................................................... 340/12.22

(58) Field of Classification Search
USPC ........ 340/825.2, 825.69, 426.13, 12.22, 5.64; 341/176
See application file for complete search history.

(56) References Cited

U.S. PATENT DOCUMENTS

| | | | |
|---|---|---|---|
| 3,597,531 | A | 8/1971 | De Marinis et al. |
| 3,990,012 | A | 11/1976 | Karnes |

(Continued)

FOREIGN PATENT DOCUMENTS

| | | | |
|---|---|---|---|
| AU | 66267/90 | | 4/1992 |
| AU | 200169851 | A1 | 1/2002 |

(Continued)

OTHER PUBLICATIONS

International Search Report for PCT/CA01/00323 mailed on Apr. 4, 2002; 7 pages.

(Continued)

*Primary Examiner* — Vernal Brown
(74) *Attorney, Agent, or Firm* — Kilpatrick Townsend & Stockton LLP

(57) ABSTRACT

A remote control includes a screen configured to display a plurality of soft buttons in a first order. The remote control further includes a memory configured to store use information for the plurality of soft buttons. The use information includes a number of button presses for each of the plurality of soft buttons. The remote control further includes a processor configured to determine whether one of the plurality of soft buttons is pressed a great number of times than a second of the plurality of soft buttons, and to change the display of the plurality of soft buttons to a second order where the one of the plurality of soft buttons is displayed in the second order at a higher position than in the first order.

20 Claims, 2 Drawing Sheets

(56) References Cited

U.S. PATENT DOCUMENTS 4,174,517 A 11/1979 Mandel
4,231,031 A 10/1980 Crowther et al.
4,287,676 A 9/1981 Weinhaus
4,377,870 A 3/1983 Anderson et al.
4,392,022 A 7/1983 Carlson
4,394,691 A 7/1983 Amano et al.
4,475,123 A 10/1984 Dumbauld et al.
4,488,179 A 12/1984 Kruger et al.
4,566,034 A 1/1986 Harger et al.
4,567,512 A 1/1986 Abraham
4,592,546 A 6/1986 Fascenda et al.
4,623,887 A 11/1986 Welles, II
4,626,848 A 12/1986 Ehlers
4,703,359 A 10/1987 Rumbolt et al.
4,706,121 A 11/1987 Young
4,712,105 A 12/1987 Kohler
4,728,949 A 3/1988 Platte et al.
4,746,919 A 5/1988 Reitmeier
4,774,511 A 9/1988 Rumbolt et al.
4,792,972 A 12/1988 Cook, Jr.
4,807,031 A 2/1989 Broughton et al.
4,825,200 A 4/1989 Evans et al.
4,825,209 A 4/1989 Sasaki et al.
4,837,627 A 6/1989 Mengel
4,845,491 A 7/1989 Fascenda et al.
4,857,898 A 8/1989 Smith
4,866,434 A 9/1989 Keenan
4,876,592 A 10/1989 Von Kohorn
4,888,709 A 12/1989 Revesz et al.
4,899,370 A 2/1990 Kameo et al.
4,918,439 A 4/1990 Wozniak et al.
4,941,090 A 7/1990 McCarthy
4,959,719 A 9/1990 Strubbe et al.
4,959,810 A 9/1990 Darbee et al.
RE33,369 E 10/1990 Hashimoto
4,962,466 A 10/1990 Revesz et al.
4,989,081 A 1/1991 Miyagawa et al.
4,999,622 A 3/1991 Amano et al.
5,001,554 A 3/1991 Johnson et al.
5,016,272 A 5/1991 Stubbs et al.
5,033,079 A 7/1991 Catron et al.
5,046,093 A 9/1991 Wachob
5,065,235 A 11/1991 Iijima
5,065,251 A 11/1991 Shuhart, Jr. et al.
5,089,885 A 2/1992 Clark
5,097,249 A 3/1992 Yamamoto
5,109,222 A 4/1992 Welty
5,115,236 A 5/1992 Kohler
5,117,355 A 5/1992 McCarthy
5,128,752 A 7/1992 Von Kohorn
5,132,679 A 7/1992 Kubo et al.
5,140,326 A 8/1992 Bacrania et al.
5,151,789 A 9/1992 Young
5,161,023 A 11/1992 Keenan
5,177,461 A 1/1993 Budzyna
5,202,826 A 4/1993 McCarthy
5,204,768 A 4/1993 Tsakiris et al.
5,206,722 A 4/1993 Kwan
5,220,420 A 6/1993 Hoarty et al.
5,228,077 A 7/1993 Darbee
5,237,327 A 8/1993 Saitoh et al.
5,249,044 A 9/1993 Von Kohorn
5,251,048 A 10/1993 Doane et al.
5,255,313 A 10/1993 Darbee
5,272,418 A 12/1993 Howe et al.
5,282,028 A 1/1994 Johnson et al.
5,285,278 A 2/1994 Holman
5,287,181 A 2/1994 Holman
5,287,268 A 2/1994 McCarthy
5,297,204 A 3/1994 Levine
5,341,166 A 8/1994 Garr et al.
5,353,121 A 10/1994 Young et al.
5,355,480 A 10/1994 Smith et al.
5,367,316 A 11/1994 Ikezaki
5,374,999 A 12/1994 Chuang et al.
5,381,991 A 1/1995 Stocker
5,382,947 A 1/1995 Thaler et al.
5,404,393 A 4/1995 Remillard
5,406,558 A 4/1995 Rovira et al.
5,410,326 A 4/1995 Goldstein
5,414,426 A 5/1995 O'Donnell et al.
5,414,761 A 5/1995 Darbee
5,416,535 A 5/1995 Sato et al.
5,418,424 A 5/1995 Aprile et al.
5,422,783 A 6/1995 Darbee et al.
5,446,551 A 8/1995 Kawaguchi et al.
5,450,079 A 9/1995 Dunaway
5,455,570 A 10/1995 Cook et al.
5,461,667 A 10/1995 Remillard
5,479,266 A 12/1995 Young et al.
5,479,268 A 12/1995 Young et al.
5,481,251 A 1/1996 Buys et al.
5,481,256 A 1/1996 Darbee et al.
5,483,276 A 1/1996 Brooks et al.
5,497,185 A 3/1996 Dufresne et al.
5,500,681 A 3/1996 Jones
5,500,794 A 3/1996 Fujita et al.
5,502,504 A 3/1996 Marshall et al.
5,504,475 A 4/1996 Houdou et al.
5,515,052 A 5/1996 Darbee
5,515,058 A 5/1996 Chaney et al.
5,515,106 A 5/1996 Chaney et al.
5,515,270 A 5/1996 Weinblatt
5,517,254 A 6/1996 Mankovitz et al.
5,523,794 A 6/1996 Mankovitz et al.
5,523,796 A 6/1996 Marshall et al.
5,524,141 A 6/1996 Braun et al.
5,524,195 A 6/1996 Clanton, III et al.
5,528,304 A 6/1996 Cherrick et al.
5,532,689 A 7/1996 Bueno
5,532,732 A 7/1996 Yuen et al.
5,532,754 A 7/1996 Young et al.
5,537,106 A 7/1996 Mitsuhashi
5,537,107 A 7/1996 Funado
5,537,463 A 7/1996 Escobosa et al.
5,539,393 A 7/1996 Barfod
5,550,576 A 8/1996 Klosterman
5,552,837 A 9/1996 Mankovitz
5,552,917 A 9/1996 Darbee et al.
5,557,338 A 9/1996 Maze et al.
5,557,721 A 9/1996 Fite et al.
5,559,548 A 9/1996 Davis et al.
5,566,353 A 10/1996 Cho et al.
5,568,367 A 10/1996 Park
5,576,755 A 11/1996 Davis et al.
5,576,768 A 11/1996 Gomikawa
5,579,055 A 11/1996 Hamilton et al.
5,579,221 A * 11/1996 Mun ............................... 700/83
5,583,491 A 12/1996 Kim
5,585,838 A 12/1996 Lawler et al.
5,585,866 A 12/1996 Miller et al.
5,589,892 A 12/1996 Knee et al.
5,592,551 A 1/1997 Lett et al.
5,596,373 A 1/1997 White et al.
5,600,573 A 2/1997 Hendricks et al.
5,603,078 A 2/1997 Henderson et al.
5,604,923 A 2/1997 Wilkus
5,614,906 A 3/1997 Hayes et al.
5,619,196 A 4/1997 Escobosa
5,619,251 A 4/1997 Kuroiwa et al.
5,625,608 A 4/1997 Grewe et al.
5,627,567 A 5/1997 Davidson
5,629,733 A 5/1997 Youman et al.
5,629,868 A 5/1997 Tessier et al.
5,631,652 A 5/1997 Lee
5,638,050 A 6/1997 Sacca et al.
5,638,113 A 6/1997 Lappington et al.
5,646,608 A 7/1997 Shintani
5,650,831 A 7/1997 Farwell
5,663,757 A 9/1997 Morales
5,671,267 A 9/1997 August et al.
5,677,711 A 10/1997 Kuo
5,684,526 A 11/1997 Yoshinobu
5,686,891 A 11/1997 Sacca et al.

(56) References Cited

U.S. PATENT DOCUMENTS

| | | | |
|---|---|---|---|
| 5,689,353 | A | 11/1997 | Darbee et al. |
| 5,695,400 | A | 12/1997 | Fennell, Jr. et al. |
| 5,710,601 | A | 1/1998 | Marshall et al. |
| 5,710,605 | A | 1/1998 | Nelson |
| 5,734,838 | A | 3/1998 | Robinson et al. |
| 5,761,601 | A | 6/1998 | Nemirofsky et al. |
| 5,768,680 | A | 6/1998 | Thomas |
| 5,774,172 | A | 6/1998 | Kapell et al. |
| 5,778,256 | A | 7/1998 | Darbee |
| 5,781,894 | A | 7/1998 | Petrecca et al. |
| 5,786,814 | A | 7/1998 | Moran et al. |
| 5,794,210 | A | 8/1998 | Goldhaber et al. |
| 5,796,832 | A | 8/1998 | Kawan |
| 5,800,268 | A | 9/1998 | Molnick |
| 5,806,065 | A | 9/1998 | Lomet |
| 5,815,086 | A | 9/1998 | Ivie et al. |
| 5,819,034 | A | 10/1998 | Joseph et al. |
| 5,819,294 | A | 10/1998 | Chambers et al. |
| 5,822,123 | A | 10/1998 | Davis et al. |
| 5,828,318 | A | 10/1998 | Cesar et al. |
| 5,828,945 | A | 10/1998 | Klosteman |
| 5,850,249 | A | 12/1998 | Massetti et al. |
| 5,855,008 | A | 12/1998 | Goldhaber et al. |
| 5,870,030 | A | 2/1999 | Deluca et al. |
| 5,870,683 | A | 2/1999 | Wells |
| RE36,119 | E | 3/1999 | Kunishima |
| 5,883,680 | A | 3/1999 | Nykerk |
| 5,886,691 | A | 3/1999 | Furuya et al. |
| 5,907,322 | A | 5/1999 | Kelly et al. |
| 5,909,183 | A | 6/1999 | Borgstahl et al. |
| 5,923,016 | A | 7/1999 | Fredregill et al. |
| 5,940,073 | A | 8/1999 | Klosterman et al. |
| 5,943,228 | A | 8/1999 | Kim |
| 5,946,646 | A | 8/1999 | Schena et al. |
| 5,949,351 | A | 9/1999 | Hahm |
| 5,953,144 | A | 9/1999 | Darbee et al. |
| 5,959,751 | A | 9/1999 | Darbee et al. |
| 5,963,145 | A | 10/1999 | Escobosa |
| 6,002,443 | A | 12/1999 | Iggulden |
| 6,002,450 | A | 12/1999 | Darbee et al. |
| 6,008,802 | A | 12/1999 | Iki et al. |
| 6,014,092 | A | 1/2000 | Darbee et al. |
| 6,073,374 | A | 1/2000 | Darbee et al. |
| 6,040,829 | A | 3/2000 | Croy et al. |
| 6,057,872 | A | 5/2000 | Candelore |
| 6,097,309 | A | 8/2000 | Hayes et al. |
| 6,097,441 | A | 8/2000 | Allport |
| 6,097,520 | A | 8/2000 | Kadnier |
| 6,104,334 | A | 8/2000 | Allport |
| 6,127,941 | A | 10/2000 | Van Ryzin |
| 6,130,625 | A | 10/2000 | Harvey |
| 6,130,726 | A | 10/2000 | Darbee et al. |
| 6,133,847 | A | 10/2000 | Yang |
| 6,144,315 | A | 11/2000 | Flick |
| 6,144,375 | A | 11/2000 | Jain et al. |
| 6,147,677 | A | 11/2000 | Escobosa et al. |
| 6,154,204 | A | 11/2000 | Thompson et al. |
| 6,157,319 | A | 12/2000 | Johns et al. |
| 6,169,451 | B1 | 1/2001 | Kim |
| 6,173,330 | B1 | 1/2001 | Guo et al. |
| 6,177,931 | B1 | 1/2001 | Alexander et al. |
| 6,195,033 | B1 | 2/2001 | Darbee et al. |
| 6,198,479 | B1 | 3/2001 | Humpleman et al. |
| 6,198,481 | B1 | 3/2001 | Urano et al. |
| 6,208,341 | B1 * | 3/2001 | van Ee et al. ................. 715/716 |
| 6,211,870 | B1 | 4/2001 | Foster |
| 6,223,348 | B1 | 4/2001 | Hayes et al. |
| 6,225,938 | B1 | 5/2001 | Hayes et al. |
| 6,243,035 | B1 | 6/2001 | Walter et al. |
| 6,255,961 | B1 | 7/2001 | Van Ryzin et al. |
| 6,271,831 | B1 | 8/2001 | Escobosa et al. |
| 6,275,268 | B1 | 8/2001 | Ellis et al. |
| 6,278,499 | B1 | 8/2001 | Darbee |
| 6,288,799 | B1 | 9/2001 | Sekiguchi |
| 6,326,947 | B1 * | 12/2001 | Capps ........................... 345/156 |
| 6,330,091 | B1 | 12/2001 | Escobosa et al. |
| 6,369,803 | B2 | 4/2002 | Brisebois et al. |
| 6,374,404 | B1 | 4/2002 | Brotz et al. |
| 6,397,187 | B1 | 5/2002 | Vriens et al. |
| 6,408,435 | B1 | 6/2002 | Sato |
| 6,445,306 | B1 | 9/2002 | Trovato et al. |
| 6,469,633 | B1 | 10/2002 | Wachter |
| 6,483,548 | B1 | 11/2002 | Allport |
| 6,483,906 | B1 | 11/2002 | Iggulden et al. |
| 6,496,135 | B1 | 12/2002 | Darbee |
| 6,504,580 | B1 | 1/2003 | Thompson et al. |
| 6,522,262 | B1 | 2/2003 | Hayes et al. |
| 6,532,592 | B1 | 3/2003 | Shintani et al. |
| 6,538,556 | B1 | 3/2003 | Kawajiri |
| 6,563,430 | B1 | 5/2003 | Kemink et al. |
| 6,567,011 | B1 | 5/2003 | Young et al. |
| 6,567,984 | B1 | 5/2003 | Allport |
| 6,587,067 | B2 | 7/2003 | Darbee et al. |
| 6,628,340 | B1 | 9/2003 | Graczyk et al. |
| 6,629,077 | B1 | 9/2003 | Arling et al. |
| 6,640,144 | B1 | 10/2003 | Huang et al. |
| 6,642,852 | B2 | 11/2003 | Dresti et al. |
| 6,650,247 | B1 | 11/2003 | Hayes |
| 6,657,679 | B2 | 12/2003 | Hayes et al. |
| 6,690,290 | B2 | 2/2004 | Young et al. |
| 6,690,392 | B1 | 2/2004 | Wugoski |
| 6,701,091 | B2 | 3/2004 | Escobosa et al. |
| 6,720,904 | B1 | 4/2004 | Darbee |
| 6,722,984 | B1 | 4/2004 | Sweeney, Jr. et al. |
| 6,724,339 | B2 | 4/2004 | Conway et al. |
| 6,747,591 | B1 | 6/2004 | Lilleness et al. |
| 6,748,248 | B1 | 6/2004 | Pan et al. |
| 6,748,462 | B2 | 6/2004 | Dubil et al. |
| 6,759,967 | B1 | 7/2004 | Staller |
| 6,781,518 | B1 | 8/2004 | Hayes et al. |
| 6,781,638 | B1 | 8/2004 | Hayes |
| 6,784,804 | B1 | 8/2004 | Hayes et al. |
| 6,784,805 | B2 | 8/2004 | Harris et al. |
| 6,785,579 | B2 | 8/2004 | Huang et al. |
| 6,788,241 | B2 | 9/2004 | Arling et al. |
| 6,813,619 | B2 | 11/2004 | Devara |
| 6,826,370 | B2 | 11/2004 | Escobosa et al. |
| 6,828,992 | B1 | 12/2004 | Freeman et al. |
| 6,829,512 | B2 | 12/2004 | Huang et al. |
| 6,829,992 | B2 * | 12/2004 | Kobayashi et al. ........... 101/228 |
| 6,842,653 | B2 | 1/2005 | Weishut et al. |
| 6,847,101 | B2 | 1/2005 | Fjelstad et al. |
| 6,859,197 | B2 | 2/2005 | Klein et al. |
| 6,862,741 | B1 | 3/2005 | Grooters |
| 6,870,463 | B2 | 3/2005 | Dresti et al. |
| 6,874,037 | B1 | 3/2005 | Abram |
| 6,882,299 | B1 | 4/2005 | Allport |
| 6,882,729 | B2 | 4/2005 | Arling et al. |
| 6,885,952 | B1 | 4/2005 | Hayes et al. |
| 6,917,302 | B2 | 7/2005 | Lilleness et al. |
| 6,933,833 | B1 | 8/2005 | Darbee |
| 6,938,101 | B2 | 8/2005 | Hayes et al. |
| 6,946,988 | B2 | 9/2005 | Edwards et al. |
| 6,947,101 | B2 | 9/2005 | Arling |
| 6,968,570 | B2 | 11/2005 | Hayes et al. |
| 6,980,150 | B2 | 12/2005 | Conway et al. |
| 7,005,979 | B2 | 2/2006 | Haughawout et al. |
| 7,009,528 | B2 | 3/2006 | Griep |
| 7,010,805 | B2 | 3/2006 | Hayes et al. |
| 7,013,434 | B2 | 3/2006 | Masters et al. |
| RE39,059 | E | 4/2006 | Foster |
| 7,046,161 | B2 | 5/2006 | Hayes |
| 7,079,113 | B1 | 7/2006 | Hayes et al. |
| 7,091,898 | B2 | 8/2006 | Arling et al. |
| 7,093,003 | B2 | 8/2006 | Yuh et al. |
| 7,102,688 | B2 | 9/2006 | Hayes et al. |
| 7,119,710 | B2 | 10/2006 | Hayes et al. |
| 7,126,468 | B2 | 10/2006 | Arling et al. |
| 7,129,995 | B2 | 10/2006 | Arling |
| 7,135,985 | B2 | 11/2006 | Woolgar et al. |
| 7,136,709 | B2 | 11/2006 | Arling et al. |
| 7,142,127 | B2 | 11/2006 | Hayes et al. |
| 7,142,934 | B2 | 11/2006 | Janik |
| 7,142,935 | B2 | 11/2006 | Janik |

(56) References Cited

U.S. PATENT DOCUMENTS 7,143,214 B2 11/2006 Hayes et al.
7,151,528 B2 12/2006 Taylor et al.
7,154,428 B2 12/2006 de Clercq et al.
7,154,483 B2 12/2006 Kobayashi
7,155,305 B2 12/2006 Hayes et al.
7,161,524 B2 1/2007 Nguyen
7,167,765 B2 1/2007 Janik
7,167,913 B2 1/2007 Chambers
7,193,661 B2 3/2007 Dresti et al.
7,200,357 B2 4/2007 Janik et al.
7,209,116 B2 4/2007 Gates et al.
7,218,243 B2 5/2007 Hayes et al.
7,221,306 B2 5/2007 Young
7,224,903 B2 5/2007 Colmenarez et al.
RE39,716 E 7/2007 Huang et al.
7,253,765 B2 8/2007 Edwards et al.
7,254,777 B2 8/2007 Hayes et al.
7,266,701 B2 9/2007 Hayes et al.
7,266,777 B2 9/2007 Scott et al.
7,268,694 B2 9/2007 Hayes et al.
7,274,303 B2 9/2007 Dresti et al.
7,281,262 B2 10/2007 Hayes et al.
7,283,059 B2 10/2007 Harris et al.
7,319,409 B2 1/2008 Hayes et al.
7,319,426 B2 1/2008 Garfio
7,436,319 B1 10/2008 Harris et al.
7,574,693 B1 8/2009 Kemink
7,612,685 B2 11/2009 Harris et al.
7,746,244 B2 6/2010 Wouters
7,889,095 B1 2/2011 Harris et al.
7,944,370 B1 5/2011 Harris et al.
8,026,789 B2 9/2011 Harris et al.
8,098,140 B1 1/2012 Escobosa et al.
2001/0033243 A1 10/2001 Harris et al.
2002/0008789 A1 1/2002 Harris et al.
2002/0046083 A1 4/2002 Ondeck
2002/0056084 A1 5/2002 Harris et al.
2002/0151327 A1 10/2002 Levitt
2002/0170073 A1 11/2002 Miller et al.
2002/0184626 A1 12/2002 Darbee et al.
2002/0190956 A1 12/2002 Klein et al.
2002/0194410 A1 12/2002 Hayes et al.
2003/0046579 A1 3/2003 Hayes et al.
2003/0048295 A1 3/2003 Lilleness et al.
2003/0095156 A1 5/2003 Klein et al.
2003/0103088 A1 6/2003 Dresti et al.
2003/0117427 A1 6/2003 Haughawout et al.
2003/0151538 A1 8/2003 Escobosa et al.
2003/0164773 A1 9/2003 Young et al.
2003/0164787 A1 9/2003 Dresti et al.
2003/0189509 A1 10/2003 Hayes et al.
2003/0193519 A1 10/2003 Hayes et al.
2003/0233664 A1 12/2003 Huang et al.
2004/0046677 A1 3/2004 Dresti et al.
2004/0056789 A1 3/2004 Arling et al.
2004/0056984 A1 3/2004 Hayes et al.
2004/0070491 A1 4/2004 Huang et al.
2004/0093096 A1 5/2004 Huang et al.
2004/0117632 A1 6/2004 Arling et al.
2004/0136726 A1 7/2004 Escobosa et al.
2004/0169590 A1 9/2004 Haughawout et al.
2004/0169598 A1 9/2004 Arling et al.
2004/0189508 A1 9/2004 Nguyen
2004/0189509 A1 9/2004 Lilleness et al.
2004/0210933 A1 10/2004 Dresti et al.
2004/0246165 A1 12/2004 Conway, Jr. et al.
2004/0261134 A1 12/2004 Perlman
2004/0263349 A1 12/2004 Haughawout et al.
2004/0266419 A1 12/2004 Arling et al.
2004/0268391 A1 12/2004 de Clercq et al.
2005/0024226 A1 2/2005 Hayes et al.
2005/0030196 A1 2/2005 Harris et al.
2005/0052423 A1 3/2005 Harris et al.
2005/0055716 A1 3/2005 Louie et al.
2005/0062614 A1 3/2005 Young
2005/0062636 A1 3/2005 Conway et al.
2005/0066370 A1 3/2005 Alvarado et al.
2005/0078087 A1 4/2005 Gates et al.
2005/0080496 A1 4/2005 Hayes et al.
2005/0088315 A1 4/2005 Klein et al.
2005/0094610 A1 5/2005 de Clerq et al.
2005/0096753 A1 5/2005 Arling et al.
2005/0097594 A1 5/2005 O'Donnell et al.
2005/0097618 A1 5/2005 Arling et al.
2005/0107966 A1 5/2005 Hayes
2005/0116930 A1 6/2005 Gates
2005/0134578 A1 6/2005 Chambers et al.
2005/0159823 A1 7/2005 Hayes et al.
2005/0162282 A1 7/2005 Dresti et al.
2005/0179559 A1 8/2005 Edwards et al.
2005/0183104 A1 8/2005 Edwards et al.
2005/0195979 A1 9/2005 Arling et al.
2005/0200598 A1 9/2005 Hayes et al.
2005/0210101 A1 9/2005 Janik
2005/0216606 A1 9/2005 Hayes et al.
2005/0216843 A1 9/2005 Masters et al.
2005/0231649 A1 10/2005 Arling
2005/0258806 A1 11/2005 Janik et al.
2005/0280743 A1 12/2005 Dresti et al.
2005/0283814 A1 12/2005 Scott et al.
2005/0285750 A1 12/2005 Hayes et al.
2006/0007306 A1 1/2006 Masters et al.
2006/0012488 A1 1/2006 Hilbrink et al.
2006/0031400 A1 2/2006 Yuh et al.
2006/0031437 A1 2/2006 Chambers
2006/0031549 A1 2/2006 Janik et al.
2006/0031550 A1 2/2006 Janik et al.
2006/0050142 A1 3/2006 Scott et al.
2006/0055554 A1 3/2006 Hayes et al.
2006/0101498 A1 5/2006 Arling et al.
2006/0125800 A1 6/2006 Janik
2006/0132458 A1 6/2006 Garfio et al.
2006/0143572 A1 6/2006 Scott et al.
2006/0150120 A1 7/2006 Dresti et al.
2006/0161865 A1 7/2006 Scott et al.
2006/0192855 A1 8/2006 Harris et al.
2006/0194549 A1 8/2006 Janik et al.
2006/0200538 A1 9/2006 Yuh et al.
2006/0259183 A1 11/2006 Hayes et al.
2006/0259184 A1 11/2006 Hayes et al.
2006/0259864 A1 11/2006 Klein et al.
2006/0262002 A1 11/2006 Nguyen
2006/0283697 A1 12/2006 Garfio
2006/0288300 A1 12/2006 Chambers et al.
2006/0294217 A1 12/2006 Chambers
2007/0037522 A1 2/2007 Liu et al.
2007/0052547 A1 3/2007 Haughawout et al.
2007/0061027 A1 3/2007 Janik
2007/0061028 A1 3/2007 Janik
2007/0061029 A1 3/2007 Janik
2007/0063860 A1 3/2007 Escobosa et al.
2007/0073958 A1 3/2007 Kalayjian
2007/0077784 A1 4/2007 Kalayjian et al.
2007/0097275 A1 5/2007 Dresti et al.
2007/0136693 A1 6/2007 Lilleness et al.
2007/0156739 A1 7/2007 Black et al.
2007/0178830 A1 8/2007 Janik et al.
2007/0206949 A1 9/2007 Mortensen
2007/0225828 A1 9/2007 Huang et al.
2007/0233740 A1 10/2007 Nichols et al.
2007/0258595 A1 11/2007 Choy
2007/0271267 A1 11/2007 Lim et al.
2007/0279244 A1 12/2007 Haughawout et al.
2007/0296552 A1 12/2007 Huang et al.
2008/0005764 A1 1/2008 Arling et al.
2008/0016467 A1 1/2008 Chambers et al.
2008/0016468 A1 1/2008 Chambers et al.
2008/0036642 A1 2/2008 Harris et al.
2008/0042982 A1 2/2008 Gates et al.
2008/0062033 A1 3/2008 Harris et al.
2008/0062034 A1 3/2008 Harris et al.
2008/0068247 A1 3/2008 Harris et al.
2008/0198059 A1 8/2008 Harris et al.
2008/0302582 A1 12/2008 Sekhri et al.

(56) References Cited

U.S. PATENT DOCUMENTS

| | | | |
|---|---|---|---|
| 2009/0224955 A1 | 9/2009 | Bates et al. |
| 2010/0033638 A1 | 2/2010 | O'Donnell |
| 2011/0133976 A1 | 6/2011 | Harris et al. |
| 2012/0326852 A1 | 12/2012 | Harris et al. |

FOREIGN PATENT DOCUMENTS

| | | | |
|---|---|---|---|
| CA | 2092003 | A1 | 11/2008 |
| CN | 1399444 | A | 2/2003 |
| CN | 1434422 | A | 8/2003 |
| DE | 19520754 | A1 | 12/1996 |
| EP | 103 438 | A1 | 3/1984 |
| EP | 0103438 | A1 | 3/1984 |
| EP | 0398 550 | A2 | 11/1990 |
| EP | 0972280 | A1 | 1/2000 |
| EP | 1014577 | A1 | 6/2000 |
| EP | 1198069 | B1 | 4/2002 |
| EP | 1777830 | A1 | 4/2007 |
| FR | 2738931 | A1 | 3/1997 |
| GB | 2081948 | A | 2/1982 |
| GB | 2175724 | A | 12/1986 |
| GB | 2304217 | A | 3/1997 |
| JP | 7-075173 | | 3/1995 |
| JP | 7112301 | B | 11/1995 |
| JP | 2002058079 | A | 2/2002 |
| JP | 2002271871 | A | 9/2002 |
| JP | 2003087881 | A | 3/2003 |
| MX | PA/2003000322 | A | 11/2003 |
| WO | WO 01/69567 | A2 | 9/1991 |
| WO | WO 93/12612 | A1 | 6/1993 |
| WO | WO 93/19427 | A1 | 9/1993 |
| WO | WO 94/15417 | A1 | 7/1994 |
| WO | WO 95/01056 | A1 | 1/1995 |
| WO | WO 95/01057 | A1 | 1/1995 |
| WO | WO 95/01058 | A1 | 1/1995 |
| WO | WO 95/01059 | A1 | 1/1995 |
| WO | WO 95/32563 | A1 | 11/1995 |
| WO | WO 95/32583 | A1 | 11/1995 |
| WO | 9628903 | A1 | 9/1996 |
| WO | WO 96/30864 | A1 | 10/1996 |
| WO | WO 97/33434 | A1 | 9/1997 |
| WO | WO 98/43158 | A | 10/1998 |
| WO | WO 98/44477 | A1 | 10/1998 |
| WO | WO 99/04568 | A1 | 1/1999 |
| WO | WO 99/34564 | A1 | 7/1999 |
| WO | WO 00/34851 | A1 | 6/2000 |
| WO | WO 03/044684 | A1 | 5/2003 |
| WO | WO 03/045107 | A1 | 5/2003 |
| WO | WO 03/060804 | A1 | 7/2003 |
| WO | WO 03/100553 | A2 | 12/2003 |

OTHER PUBLICATIONS

Ciarcia, S., "Build a Trainable Infrared Master Controller," *Byte*, 12(3): 113-123 (1987).

Ciarcia, S., *The Best of Ciarcia's Circuit Cellar*, pp. 345-354 (1987).

Konstan, J. A., "State problems in programming human-controlled devices," *Digest of Tech. Papers of Int Conf. on Consumer Electronics (ICCE)*, pp. 122-123 (1994).

Press Release: "Philipis Revolutionizes Home Theatre Control"; 1998, 3 pages.

"ProntoEdit User Manual"; 2002, http://www.pronto.philips.com/index.cfm?id=241, 85 pages.

"Pronto Review"; www.remotecentral.com/pronto/index.html, 3 pages.

Pronto link to downloadable files for components from different manufacturers; http://www.remotecentral.com/files/index.html, 3 pages.

Radio Shack, *Universal Remote Control Owners Manual*, pp. 1-19, (1987).

* cited by examiner

CONVENIENT AND EASY TO USE BUTTON LAYOUT FOR A REMOTE CONTROL

CROSS-REFERENCES TO RELATED APPLICATIONS

This application is a non-provisional of, and claims priority to, U.S. Provisional Patent Application No. 60/976,074, filed Sep. 28, 2007, titled "CONVENIENT AND EASY TO USE BUTTON LAYOUT FOR A REMOTE CONTROL,", of Alex Zaliauskas et al., and which is incorporated by reference herein in its entirety for all purposes.

This application is a continuation of and claims priority to, U.S. patent application Ser. No. 11/841,778, filed Aug. 20, 2007, titled "Online Remote Control Configuration System," of Glen McLean Harris et al., which is a continuation of U.S. patent application Ser. No. 10/839,970, filed May 5, 2005, titled "Online Remote Control Configuration System," of Glen McLean Harris et al.; which is a continuation of U.S. application Ser. No. 09/804,623, filed Mar. 12, 2001, titled "Online Remote Control Configuration System," of Glen McLean Harris et al.; which claims the benefit of U.S. Provisional Application No. 60/189,487, filed Mar. 15, 2000 titled "System, Method and Apparatus for an Internet Enabled User Interaction Device," of Glen McLean Harris et al., and each of which is incorporated by reference herein in its entirety for all purposes.

This application is a continuation of and claims priority to, U.S. patent application Ser. No. 11/841,748, filed Aug. 20, 2007, titled "State-Based Remote Control System," of Glen McLean Harris et al., which is a continuation of U.S. patent application Ser. No. 10/870,339, filed Jun. 16, 2004, titled "State-Based Remote Control System," which continuation application claims priority of U.S. patent application Ser. No. 09/804,718, filed Mar. 12, 2001, issued as U.S. Pat. No. 6,784,805, titled "State-Based Remote Control System," which claims the benefit of U.S. Provisional Patent Application No. 60/253,727, filed Nov. 29, 2000, titled "State-Based Remote Control," and U.S. Provisional Patent Application No. 60/189,487, filed Mar. 15, 2000, titled "System, Method and Apparatus for an Internet Enabled User Interaction Device," and each of which is incorporated by reference herein in its entirety for all purposes.

This application is a continuation of and claims priority to, U.S. patent application Ser. No. 11/408,440, filed Apr. 20, 2006, titled "System and Method for Adaptive Programming of a Remote Control," of Godwin Liu et al., which claims the benefit of U.S. Provisional Patent Application No. 60/673,479, filed Apr. 20, 2005, titled "System and Method for Adaptive Programming of a Remote Control," of Godwin Liu, and each of which is incorporated by reference herein its entirety for all purposes.

BACKGROUND OF THE INVENTION

The present invention relates generally to an improved remote control, and more particularly, to convenient and easy to use button placement on remote controls.

Home entertainment systems are becoming increasingly complex. A representative user will often have a TV, a DVD player, a VCR, a stereo receiver, and the like as part of his home entertainment system. Using multiple remote controls, each specific to a particular appliance, is very cumbersome and inconvenient to a user.

To address this problem, universal remote controls have become available on the market. Such universal remote controls may control several devices. While such remote controls manage to reduce the clutter associated with multiple device-specific remote controls, they are still often inconvenient to use. Many such universal remote controls have a button for each device, which needs to be pressed before that device may be operated. For instance to watch a DVD, a user may need to press a "TV" button, and then the "power" button on the remote control to turn on the TV, then press a "Receiver" button, and then the "power" button on the remote control to turn on the stereo receiver. The user may also need to select the correct mode for the stereo receiver to provide audio from the DVD player to the speakers. Next, the user would need to press a "DVD" button, and then the "power" button on the remote control to turn on the DVD player. The play button may be used to start playing the DVD. For simple things such as increasing the volume on the receiver, the user would need to press the "Receiver" button again before pressing the "Volume" button. It may be seen that with one universal remote control, numerous steps may still need to be taken by the user for even very simple activities. Moreover, there are several other problems with conventional universal remote controls. For instance, there is a tremendous clutter of buttons. Many universal remote controls have a plurality of buttons wherein many are never (or very rarely) used by the users since the manufacturer attempts to have physical buttons for each possible command of each possible electronic device. Further, such conventional universal remote controls do not lend themselves to efficient and easy programming to control a plurality of external electronic devices. As a corollary, conventional universal remotes are not always properly programmed, thereby leading to consumer dissatisfaction.

Another evolution in remote controls emerged in response to this need. Such remote controls were activity based remote controls, which permitted users to configure simple activities such as "Watch TV", "Watch a DVD" etc., based on the particular configuration of the user's entertainment systems, and then to simply select the desired activity. Examples of such remote controls are the Harmony® remotes from Logitech Europe, S.A. (Romanel-sur-Morges, Switzerland), the assignee of the present invention.

As more and more sophisticated functionality gets included in a single remote, there is a need to provide users with more options on the remote control. One way in which this is handled is by including additional hard buttons on the remote control. In light of the desire for a small and compact form factor for remote controls, this leads to increased clutter on the remote control, as well as to increased user confusion in dealing with the additional hard buttons. Further, all such buttons are not useable at all times, and it is not clear to the user which buttons are useable at any given time. Moreover, numerous buttons on a remote control take away from a sleek and flat form factor, which is becoming increasingly important to users. Another way to provide users with more options on the remote control is by placing a screen, such as an LCD, having buttons thereon, however this also takes up space on the remote control, and additional buttons are needed to navigate and operate the buttons on the screen.

Users often prefer to have a less cluttered remote control which reflects their usage patterns. Additionally, users often prefer to have a remote control with buttons that are easy to find and use. Ideally, the button placement should be such that a user does not need to look at the remote control to use it, but may instead "blindly" navigate the remote control. Moreover, users often like to be able to receive some feedback regarding which buttons they are touching, again without having to look at them.

There is thus a need for a button layout on a remote control that is intuitive and easy to use. Further, there is a need for a button layout that aids the user in blind navigation, and which additionally provides the user with tactile feedback. Moreover, there is need for a button layout on a remote control that reflects usage patterns.

BRIEF SUMMARY OF EMBODIMENTS OF THE INVENTION

The present invention provides an improved remote control, and more particularly, provides convenient and easy to use button placement on remote controls.

According to one remote control embodiment of the present invention, the remote control includes a screen configured to display a plurality of soft buttons in a first order. The remote control further includes a memory configured to store use information for the plurality of soft buttons. The use information includes a number of button presses for each of the plurality of soft buttons. The remote control further includes a processor configured to determine whether one of the plurality of soft buttons is pressed a great number of times than a second of the plurality of soft buttons, and to change the display of the plurality of soft buttons to a second order where the one of the plurality of soft buttons is displayed in the second order at a higher position than in the first order.

A remote control system according to one embodiment of the present invention includes a remote control having a screen configured to display a plurality of soft buttons in a first order and a second order. The remote control is configured to collect tracking information for the soft buttons wherein the tracking information includes a number of button presses for each soft button. The remote control system further includes a remote database configured to receive the tracking information from the remote control. The remote database is configure to determine whether one of the soft buttons is pressed a great number of times than other of the soft buttons, and based on the determination send a command to the remote control to change the display of the soft buttons from the first order to the second order where the one soft button is displayed in the second order at a higher position than in the first order.

According to another specific embodiment of the remote control system, the system further includes a host computer configured to couple to the remote control to receive the tracking information from the remote control; and a network configured to receive the tracking information from the host and transfer the tracking information to the remote database.

According to another specific embodiment of the remote control system, the system further includes at least a second remote control configured to receive the command from the remote database.

According to another specific embodiment of the remote control system, the system further includes the remote control of the remote control system is configured for use by a plurality of users and display the soft button on the screen in a unique configuration for each user based on tracking information for each user.

A remote control system according to another embodiment of the present invention includes a remote control having a screen configured to display a plurality of soft buttons in a first order and a second order. The remote control is configured to collect tracking information for the soft buttons wherein the tracking information includes a number of button presses for each soft button. The system further includes a host configured to receive the tracking information from the remote control. The host is configure to determine whether one of the soft buttons is pressed a great number of times than other of the soft buttons, and based on the determination send a command to the remote control to change the display of the soft buttons from the first order to the second order where the one soft button is displayed in the second order at a higher position than in the first order.

A remote control according to another embodiment is configured to facilitate blind navigation of the remote control for control of a user's home-entertainment system. The remote control includes a display; a plurality of zones placed underneath the display, each zone includes a plurality of buttons, wherein a most frequently used one of the plurality of zones is placed in an easily accessible location on the remote control, and where in a most frequently used of the plurality of buttons is placed in a central location within the one of the plurality of zones.

A remote control method according to one embodiment includes providing a plurality of zones on the remote control, each zone serving a specific purpose, and each zone comprising a plurality of buttons. The method further includes placing the plurality of zones on the remote control such that a more frequently used one of the plurality of zones is naturally touched by the user gripping the remote control. The method further includes placing the plurality of buttons within one of the plurality of zones such that the user can more easily access a more frequently used of the plurality of buttons. The method further includes formatting the plurality of buttons within the one of the plurality of zones such that the user can easily tactilely distinguish between the plurality of buttons.

According to a specific embodiment of the present invention, the step of formatting the plurality of buttons includes of one of shaping, sizing, and texturing the plurality of buttons.

According to a specific embodiment of the present invention, the method further includes collecting data relating to usage patterns to determine one of the more frequently used one of the plurality of zones and the more frequently used of the plurality of buttons. The collecting step may includes recording first data relating to frequency of usage of one of the plurality of zones from the remote control; recording second data relating to frequency of usage of one of the plurality of buttons from the remote control; and transmitting the first and second data to a database.

According to another embodiment of the present invention, a remote control system includes a plurality of elements of a user interface; and a processor configured to manipulate the plurality of the elements of the user interface, based upon usage information for a subset of the plurality of elements of the user interface. The usage information includes a frequency of usage of each of the subset of the plurality of elements. According to a specific embodiment of the remote control system, the system further includes a memory configured to store the usage information. The processor may be located on a remote server or an a local host.

Other features and advantages of the invention will be apparent in view of the following detailed description and accompanying figures.

DETAILED DESCRIPTION OF THE INVENTION

Embodiments of the present invention relate to a system and a method for a button layout on an activity-based remote control that is intuitive and easy to use. Specific embodiments of the present invention relate to a button layout on an activity-based remote control that aids a user in blind navigation of the remote control, and which additionally provides the user with tactile feedback. Specific embodiments of the remote control provide a button layout that reflects usage patterns. An activity-based remote control in accordance with embodiments of the present invention is more intuitive to use, creates less of an obstruction, has an beneficially ergonomic interfaces, and overall greatly simplifies and enhances the use of the remote control. An activity-based remote control in accordance with one embodiment of the present invention includes a button layout that reflects usage patterns of various buttons.

It is noted that while the discussion here focuses on an activity-based remote control, embodiments of the present invention may be applied to other devices as well, where the advantages provided by the present invention are beneficial. It is also noted that while several embodiments below are discussed with reference to "buttons", the present invention is in no way limited to reordering, tracking usage of, etc. buttons alone, but rather can apply to any type of user interface. The use of the word "buttons" is for ease of readability and for description of specific embodiments.

Button Layout

A remote control in accordance with one embodiment of the present invention has a button layout that aids the user in blind navigation. Blind navigation of the remote control includes the tactile use of the remote control without looking at the remote control to determine which buttons the user would like to press. In one embodiment of the present invention, the button layout provides the user with tactile feedback for determining which button the user would like to press.

A remote control in accordance with another embodiment of the present invention organizes buttons in various zones (e.g., transport zone, control zone, etc.). These zones are described in greater detail below. Additionally, the placement of the zones is dependent on how frequently these zones are used, user preferences, and the like. Moreover, the spacing between various buttons in these zones, and the size, texture, color etc. of these various buttons are also based upon user preferences, and to aid users in blind navigation of the remote control. A remote control in accordance with an embodiment of the present invention is an activity-based remote control.

Figure 1:
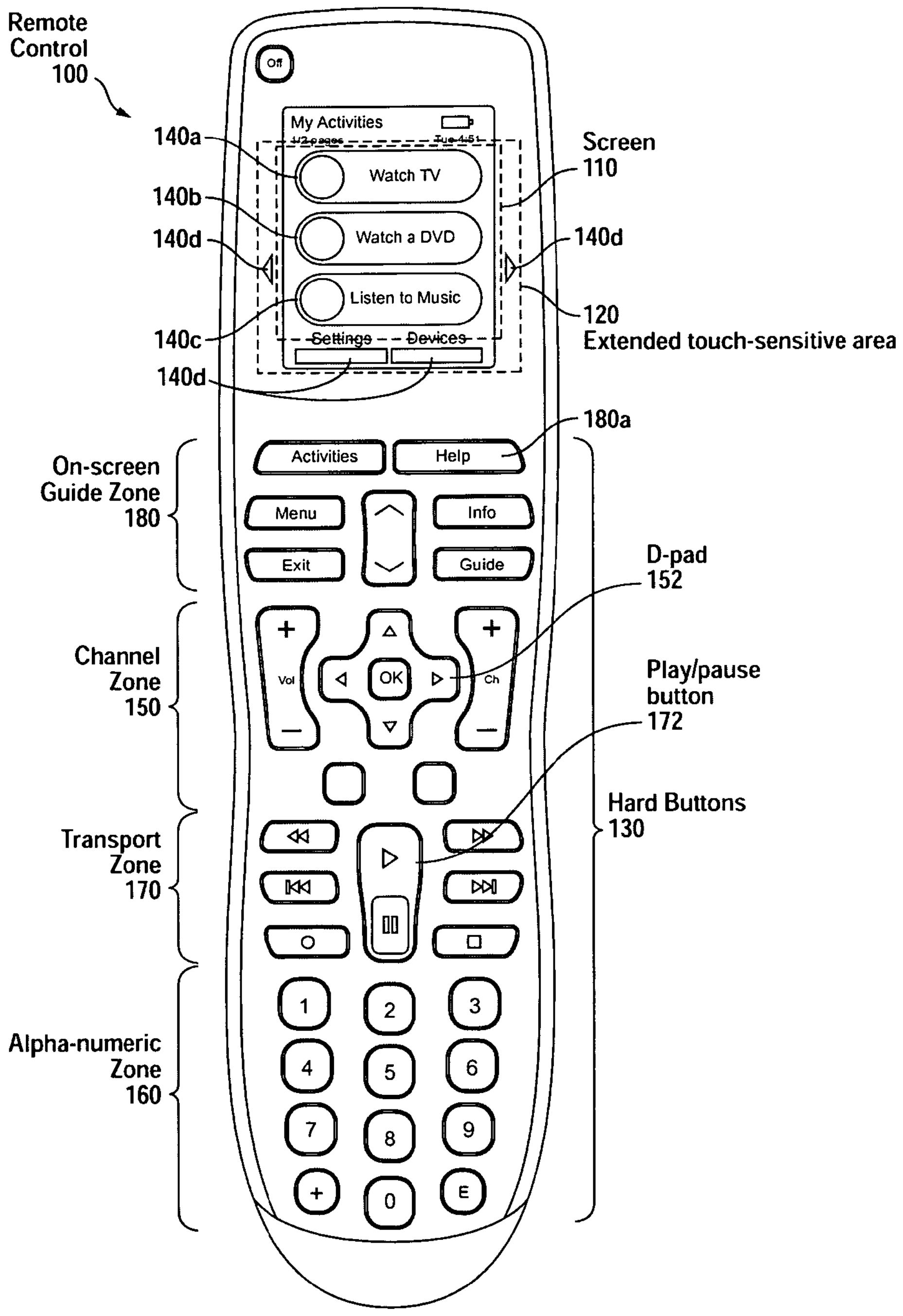
FIG. 1 is a simplified schematic of an activity-based remote control according to one embodiment of the present invention.

FIG. 1 is a simplified schematic of an activity-based remote control 100 according to one embodiment of the present invention. Example activities of an activity-based remote control are labeled with reference numbers 140*a*-140*d*, and may include "Watch TV", "Watch a DVD", "Listen to Music", or scroll to a new screen, etc.

Activity-based remote control 100, in accordance with an embodiment of the present invention, is divided into two primary interfaces for control: (1) a screen (e.g., an LCD) that is touch-sensitive; and (2) a hard button area. The screen is labeled with reference number 110. According to one embodiment, an extended touch-sensitive area 120 (denoted by the larger dashed rectangle in FIG. 1) extends beyond a portion of the screen on which images of the activities are displayed. Both screen 110 and extended touch-sensitive area 120 may include soft buttons. Soft buttons are buttons whose activities may be changed wherein the activity change may be associated with a changed icon or the like. For example, the "Watch TV" button, the "Watch a DVD" button, the "Listen to Music" button on screen 110 may be soft buttons. These buttons may be changed based on different information such as how the buttons are used by a user as describe below in detail. The hard buttons of the activity-based remote control are labeled with reference number 130.

As briefly discussed above, screen 110 (denoted by the smaller dashed rectangle in FIG. 1) includes soft buttons, which are sensitive to a user's touch. Screen 110 is the primary location for users to begin request for activities, such as "Watch TV". If a user touches a soft button, such as "Watch TV" the remote control controls the user's TV to trigger the action corresponding to that option. According to one embodiment of the present invention, screen 110 is not touch sensitive and activities are selected by touching buttons in the extended touch-sensitive area 120. According to another embodiment, hard button are disposed adjacent to the activities and the activities are selected by pressing the hard buttons.

According to one embodiment, a hard button area 130 includes a set of pressable buttons and includes the most popular buttons for compatibility with today's home entertainment devices and is a primary interface of the remote control for interacting with the user's home entertainment system. In accordance with an embodiment of the present invention, hard button area 130 is populated with approximately 40 buttons (far fewer than today's most popular remote controls), where these 40 buttons are carefully chosen through user study and research as described herein.

Figure 2:
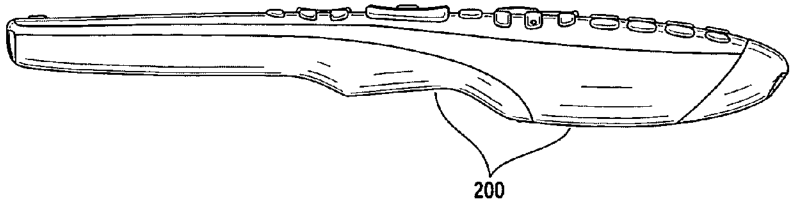
FIG. 2 is a side of the activity-based remote control and shows a dual underside grip according to one embodiment of the present invention.

In accordance with an embodiment of the present invention, the ergonomics of the activity-based remote control is a key component in the user's ease of use (sometimes referred to herein as "navigation") of the activity-based remote control. In FIG. 2, a dual underside grip 200 may be seen. This dual underside grip not only helps the user fit activity-based remote control 100 comfortably in the user's hand, but also helps the user to guide the user's hand to the various zones of control of the activity-based remote control. For example, the user may hold the rear portion of the dual underside grip for use of the hard button on the rear portion of the remote control, and hold the forward portion of the dual underside grip for use of the hard button in the middle or forward portion of the remote control. This is achieved by the multiple possible hand positions on the dual underside grip of the remote control that positions the user's thumb strategically with respect the zones.

In accordance with an embodiment of the present invention, the activity-based remote control's button layout has been organized into zoned to in-turn organize groups of hard buttons with like functions in a defined areas so that the hard buttons may be conveniently (i.e., easy to reach, for example, for a user's thumb) located with respect to other hard buttons. In one embodiment, activity-based remote control 100 is designed so that the dual underside grip in a user's hand centers the thumb in channel zone 150 directly on the OK button on the D-pad 152. The user's hand is partly guided in this manner due to the tapered shape of activity-based remote control 100 in channel zone 150 region. All other zones are then prioritized and located either directly above or below this primary zone.

From the bottom of the activity-based remote control the button zones are:

Alpha-numeric keypad zone 160

Transport zone (or Play zone) 170: This zone includes the play, pause, skip and rewind buttons Channel zone 150: This zone includes the Ch+/−, Vol+/−, Mute and previous channel buttons On screen guide zone 180: This zone includes buttons used for devices that use on screen guide and menu (e.g., DVRs)

As mentioned above, each one of the zones 150-180 is located in its respective location based on studies in household consumer electronic device ownership and ergonomic principles. Such findings include, but are not limited to, the following. Based on data collected in accordance with an embodiment of the present invention, it was found that users used some buttons more frequently than others. For instance, the "Guide" button appears to be used more frequently than the "Channel +/−" buttons in accordance with an embodiment of the present invention. Further, it appears that Digital Video Recorder (DVR) usage is on the rise. Amongst the users studied, many users preferred to have the "OFF" button and the "Activities" button at the top of the remote control. Many placed the two beside each other. Many users placed the screen in the upper portion of the activity-based remote control. Many users also placed the D-pad in the middle of the remote control of slightly lower down. Several users placed the Menu/Guide/Info/Exit Buttons in the immediate vicinity of the D-pad. Many users preferred the Transport Controls Buttons to be at or near the bottom of the activity-based remote control.

In one embodiment, each zone 150-180 has a tactile center point guided by the grip position of the activity-based remote control in the user's hand. Further, particular buttons within the zones 150-180 are placed in relation to each other based on device ownership and usage data. As an example, let us consider the on-screen guide zone 180. The Guide button is used to access on screen guides for digital cable, satellite, DVRs, etc. Its close proximity to the Ch+ button is directly related to the channel surfing habits of today's user. The Arrow up and Arrow down keys act as the thumbs resting position within the on-screen guide zone 180 and act as a "paging" button to scroll page by page of the onscreen guide which may be used for quicker navigation. On the lower left of the on-screen guide zone 180 is the exit button which is used to exit the guide. The Info button pulls up additional information about a program while within the guide and finally, the Menu button is primarily used to pull up the setup menu for the device being controlled, or for a DVD player the Menu to choose chapters, languages or extra features. It has been located in the upper left corner of the grouping based on its relatively limited usage. The upper left corner of the guide is furthest for a thumb reach of a right handed user hand.

In accordance with an embodiment of the present invention, the shape, size and/or texture of specific buttons is varied to provide tactile cues to the user to help differentiate between various zones as well as for navigation within a particular zone. As an example of differentiation between zones, notice that the shape and size of the buttons on the top of the transport zone 170 is different than the lowest buttons in the Channel zone 150 above it. As an example of differentiation within a single zone, notice the shape of the play/pause button 172 in the transport zone 170. This button is divided into a pause portion which has a concave shape, and a play portion which has a convex shape. Furthermore, the skip and replay buttons have a pip on the button to differentiate them from the buttons directly above and below them. In accordance with an embodiment of the present invention, most buttons on activity-based remote control 100 are separated from each other by some space.

Each of the features above helps to improve blind (tactile) navigation of activity-based remote control 100. In addition, activity-based remote control 100 is designed, in one embodiment, to provide visual cues to the user. In one embodiment, visual clarity is provided by using highly visible black buttons with white laser etching and a relatively bright backlighting for high contrast targets if the remote control needs to be looked at to navigate. In one embodiment, the activity-based remote control's backlighting may be activated and/or controlled by a tilt sensor included in activity-based remote control 100.

Data Collection and Analysis of Usage Patterns

In accordance with an embodiment of the present invention, data regarding usage patterns of activity-based remote controls by one or more users is collected and analyzed to determine whether changes may be made to a configurations of buttons on the activity-based remote control to provide the user with a configuration that is based on the usage pattern.

Data for usage patterns is collected, in one embodiment, from various sources, including but not limited to direct primary customer studies (in-home usage, usability testing, focus groups, and the like). Additional data regarding user usage patterns are also collected, in accordance with an embodiment, from customer support/engineering feedback from call centers, web-based help centers, and the like.

Furthermore, external third party research may also be used to collate data of usage patterns. Such third party research may include the consultation of industry experts, ergonomists, user interface (UI) designers, design firms, and the like.

A series of user studies are conducted, in accordance with an embodiment of the present invention, to determine user preferences for button characteristics, such as tactile feel, type, spacing, zoning priorities for certain button clusters on an activity-based remote control, analysis of early form model concepts, and the like.

Further, an analysis of currently existing activity-based remote controls is performed, in accordance with an embodiment of the present invention, including activity-based remote controls from key industry leaders in device technology (e.g., Tivo, Windows Media Center, etc.)

Users are also allowed, in accordance with an embodiment of the present invention, to "build their own remote control", and to analyze a number of form models for ergonomic comfort and grip.

In accordance with an embodiment of the present invention, an activity-based remote control communicates with a remote database and benefits from a database which is updated substantially continuously by data obtained from other users.

Figure 3:
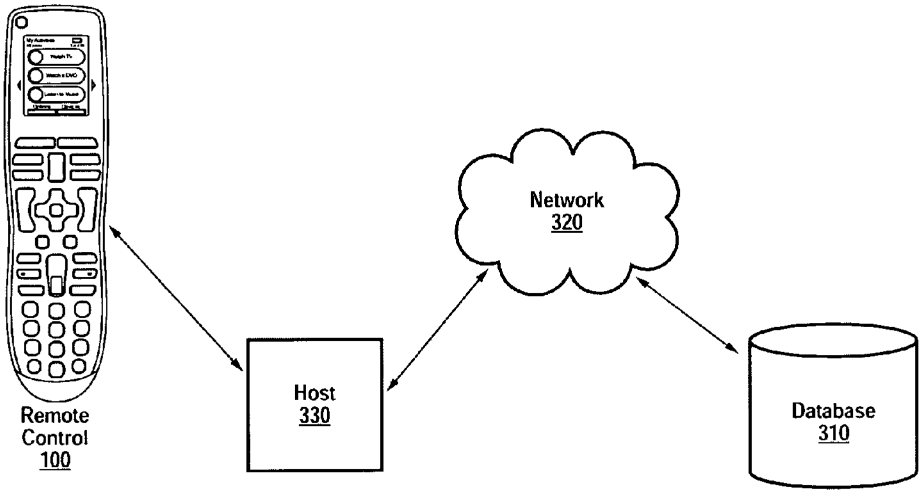
FIG. 3 is a block diagram of a remote control system according to one embodiment of the present invention.

FIG. 3 is a block diagram of a remote control system according to one embodiment of the present invention. The remote control system includes activity-based remote control 100, a remote database 310, a network 320, and a host 330.

In one embodiment, host 330 is a conventional computer system, that may include a computer, a storage device, a network services connection, and conventional input/output devices such as, a display, a mouse, a printer, and/or a keyboard, that may couple to the computer. The computer may include a conventional operating system, an input/output device, and network services software. In addition, the computer may include a network service connection which includes those hardware and software components that allow for connecting to a conventional network service. For example, the network service connection may include a connection to a telecommunications line (e.g., a dial-up, digital subscriber line ("DSL"), a T1, or a T3 communication line). Host 330, the storage device, and the network services connection, may be available from, for example, IBM Corporation (Armonk, N.Y.), Sun Microsystems, Inc. (Palo Alto, Calif.), or Hewlett-Packard, Inc. (Palo Alto, Calif.). It is to be noted that host 330 may be any computing device capable of functionalities described herein, such as, but not limited to, gaming consoles, personal digital assistants (PDAs), cell-phones, and the like.

In one embodiment, the user connects activity-based remote control 100 to host 330, and activity-based remote control 100 communicates with remote database 310 via host 330 through network 320. A remote database as referred to herein may include memory for storing information and a server or the like for processing the information. All processing associated with the remote database that might be performed by a server will be referred to herein as being performed by the remote database. The communication between activity-based remote control 100 and host 330 may occur via a wired link (e.g., USB), or a wireless link (e.g., direct wireless link, via a wireless home network, and the like). It is to be noted that in this or other embodiments, activity-based remote control 100 does not need to connect to the host to communicate with the remote database, but rather may use network 320 directly. For instance, activity-based remote control 100 may be equipped to use an in-home wireless network, which may in turn communicate with an external network. An Ethernet connection, a communication with a cell-phone, and the like, may be used by the activity-based remote control. It will be obvious to one of skill in the art that any wired or wireless connection may be used by the activity-based remote control to communicate with the remote database.

Network 320 may be any network, such as a Wide Area Network (WAN) or a Local Area Network (LAN), or any other network. A WAN may include the Internet, the Internet 2, and the like. A LAN may include an Intranet, which may be a network based on, for example, TCP/IP belonging to an organization accessible only by the organization's members, employees, or others with authorization. A LAN may also be a network such as, for example, Netware™ from Novell Corporation (Provo, Utah) or Windows NT from Microsoft Corporation (Redmond, Wash.). Network 320 may also include commercially available subscription-based services such as, for example, AOL from America Online, Inc. (Dulles, Va.) or MSN from Microsoft Corporation (Redmond, Wash.). Network 320 may also be a home network, an Ethernet based network, a network based on the public switched telephone network, a network based on the Internet, or any other communication network. Any of the connections in network 320 may be wired or wireless.

The assignee of the present invention owns such a system for configuring activity-based remote control devices to operate media systems wherein the user informs the system, via a user interface (e.g., a web page), of the devices they wish to control and the system assembles a configuration data set comprising the necessary infrared control signals and associated commands and programs which is then downloaded, through the Internet, into the activity-based remote control to configure it to operate the media system. The user may use host 330 to access the user interface used to configure activity-based remote control 100. The on-line configuration system is described in co-pending U.S. patent application Ser. No. 10/839,970, titled "Online Remote Control Configuration System", which is herein incorporated by reference in its entirety. The information downloaded into the activity-based remote control is stored in a remote database, which is substantially continually updated based upon input from other users as well. The functioning of the remote database, and uploading and downloading of information from this remote database is described in co-pending U.S. patent application Ser. No. 11/199,922, titled "Method and Apparatus for Uploading and Downloading Remote Control Codes" which is herein incorporated by reference in its entirety.

In one embodiment, the remote database includes codes for various activity-based remote controls, configurations of other users' home entertainment systems, and the like. In one embodiment, the remote database includes usage patterns of each user, which are, in one embodiment, stored on the remote in a local memory until they are communicated to the remote database. In one embodiment, such data is directly communicated from the activity-based remote control to the remote database. In one embodiment, such data is not communicated to the remote database, but simply to the host. In yet another embodiment, such data is not communicated to either the remote database or the host, but instead is assessed and used on the remote control itself, to further enhance user experience. Further, setup information regarding the home-entertainment systems and the activities desired by the users (e.g., Watch TV, Watch DVD, Listen to Music and the like) is stored in such a remote database in accordance with an embodiment of the present invention, since the activity-based remote control is connected to a remote server during setup of the remote control in accordance with an embodiment of the present invention. In one embodiment, information regarding where users succeed, where they fail, how long they take to complete information on a certain page, and the like is stored. Valuable data may also include identifying high action activities where the user interacts more with activity-based remote control 100 (e.g., Watch TV) and/or with devices which the user controls more (e.g., the stereo receiver to control the volume). Buttons used for such activities/devices need to be more accessible to the user. In contrast, certain activities/devices (e.g., Watch a DVD, DVD Player, etc.) are low action. Such data is valuable in designing the optimal button layout for an activity-based remote control in accordance with the present invention.

In accordance with an embodiment of the present invention, a button tracking study may include tracking information regarding which buttons a user presses, how frequently each button is pressed, and the like. This may include information regarding which activities are more commonly performed, such as pressing the Watch TV soft button, pressing the Watch a DVD soft button, pressing the Listen to Music soft button, and the like. The collected tracking information may be stored, in one embodiment, in a local memory in the activity-based remote control, and communicated to the remote database if the user couples the activity-based remote control to the remote database, for example, via the host and network. In another embodiment, this information may be communicated to the remote database on a substantially continual basis, via an "always-on" connection between the activity-based remote control and the server hosting the remote database. As mentioned briefly above, it is to be noted that the tracking information may be stored on one or more databases, one or more servers, one or more hosts, on the remote itself, and/or the like.

According to one embodiment, the remote database is configured to run one or more computer programs to analyze the tracking information to determine whether any one of the soft buttons on the activity-based remote control is pressed with a higher frequency than other soft buttons. If the remote database determines that a given one of the soft keys is pressed more frequently then other soft buttons, then the remote database may send, via the network, a command to the activity-based remote control to change a configuration of the soft buttons. For example, the remote database may be configured to send a command to move the given soft button pressed with higher frequency above the other soft buttons or otherwise display the given soft button more prominently on the activity-based remote control. Displaying the given soft button on the activity-based remote control more prominently may include moving the given soft button from a first menu screen to second menu screen where each menu screen includes a plurality of soft button. The given soft button may be moved to the second menu screen because the second menu screen might be displayed higher in a hierarchy of menu screens, which are displayed on the activity-based remote control. According to another example, the soft buttons may be configured to be displayed on the activity-based remote control in a scrollable menu. The given soft button may be moved in the scrollable menu so that the given soft button is displayed at or near the top of the scrollable menu, for example, so that the given soft button may be displayed on the scrollable menu without scrolling. Displaying the given soft button to a relatively more prominently position provides that the given soft button will be more easily accessible to the user, because the given soft button will be more easily seen, and because the user will have to navigate the fewer or no menus to have the given soft button displayed on the screen.

According to one embodiment, the activity-based remote control may be configured to store and analyze the tracking information to rearrange and/or move the soft buttons on the screen. According to yet another embodiment, host 330 may be configured to store and analyze the tracking information and send a command to the activity-based remote control to rearrange the soft buttons on the activity-based remote control's screen. According to yet another embodiment, soft buttons may be moved if the soft button is pressed a number of time that exceeds a threshold number. The activity-based remote control, the host, and/or the remote database may be configured to determine whether a soft button is pressed more than the threshold number and effect rearrangement of a soft key as described above.

According to a further embodiment, the activity-based remote control may be configured for use for a plurality of users. That is, the activity-based remote control may be configured to display the soft buttons in a configuration that may be different for each user of the activity-based remote control. The activity-based remote control may be configured to query of user for the user's identification prior to the user using the activity-based remote control. The activity-based remote control may then collect tracking information for each user of the activity-based remote control and may arrange the soft buttons as describe above for each user.

According to another embodiment, the remote database may collect the tracking information from an activity-based remote control as described above and may analyze the tracking information as discussed above. The remote database may then use information from the tracking information to suggest soft button configurations to another activity-based remote control users via the users' activity-based remote control. For example, if a first user uses a soft button with a relatively high frequency, and the soft button is moved on the screen of the first user's activity-based remote control as described above, the remote database may suggest the soft button change on the first user's activity-based remote control to a second activity-based remote control user via the second user's activity-based remote control.

According to another embodiment, the remote database may collect the tracking information from a plurality of activity-based remote controls used by a plurality of disparate users, and analyze the tracking information to determine whether patterns exists in the users' use of the activity-based remote controls. The tracking information may be used to arrange the configuration of hard buttons and/or soft buttons on new (next generation) activity-based remote controls. Further, each newly manufactured activity-based remote control may be coupled to the remote database such as discussed above and may be commanded by the remote database to display a set of soft buttons in a certain order based on the tracking information collected by the remote database, and based on activities selected by specific users.

The assignee of the present invention owns such a remote database. It will be obvious that the value of such a database in assessing usage patterns is in proportion to the number of users using the database. The database owned by the assignee has several million users at the time of this writing. The data collection on the activity-based remote control may be analyzed to reveal specific user trends in pressing the soft button not anticipated by the manufacturer and may be used to optimize operation of the activity-based remote control as describe above.

Figure 4:
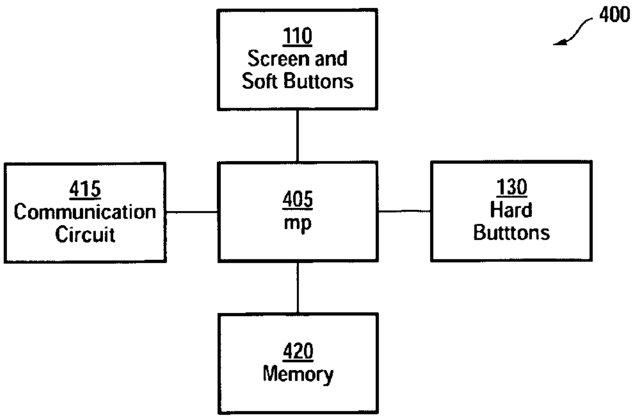
FIG. 4 is a simplified schematic of a control circuit that may be included in an activity-based remote control according to one embodiment of the present invention.

FIG. 4 is a simplified schematic of a circuit 400 that may be included in activity-based remote control 100. Circuit 400 may be configured to control operation of the activity-based remote control and may be configured to control communication with host 330. Circuit 400 may include a processor circuit 405, such as a microprocessor, screen 110, a communication circuit 415, a memory 420, and hard buttons 130. The processor circuit may be configured to execute program code, which is stored in the memory, to execute the methods described herein, such as tracking soft key use, storage of tracking information, and analysis for trends (e.g., use of a given soft key exceeding a threshold number, or having a frequency of use greater than other soft keys) in soft key use for rearrangement of the soft keys on the screen if a trend is recognized by the processor circuit. The memory may be configured to store the tracking information for transfer to the host by the communication circuit or for analysis by the processor circuit. The communication circuit may be configured to transfer tracking information to, and receive commands from, the host as described generally above.

According to another embodiment of the present invention, the issuance of a set of command codes are changed from a first configuration to a second configuration based on tracking information collected the activity-based remote control and analyzed by the activity-based remote control, the host, and/or the remote database. Command codes are the codes that the activity-based remote control issues (e.g., via IR, RF, etc.) to a controlled device (e.g., TV, DVD, Stereo, Amplifier, VCR,) that is commanded by the activity-based remote control so that the device performs a function (e.g., turn on TV) commanded by the activity-based remote control. For example, tracking information may be collected for the press of one of the activity buttons (e.g., Watch TV) and the subsequent press of help button 180*a*. More specifically, if a given activity button is pressed a given number of times, which exceeds a threshold number, followed by a subsequent press of the help button, this tracking information may be collected and a determination may be made that the given activity (e.g., Watch TV) is not operating properly. A command my then be issued to the activity-based remote control, by the host, the remote database, or the activity-based remote control itself, to change the set of command codes from the first configuration to the second configuration. For example, the second configuration for the set of command codes may have different timing compared to the first configuration for the set of command codes, and/or the order in which the command codes are issued may be different for the second configuration as compared to the first configuration. For example, for a changed timing, the delay between specific command codes may be increased or decreased so that the Watch TV activity occurs properly. For example, the set of command codes for the Watch TV activity may include turning on the TV, turning on a cable box, and turning the cable box to channel 3. In the second configuration, the time between issuance for the command code for turning on the TV and the cable box may be increased in the second configuration as compared to the first configuration. Alternatively, the command for turning on the cable box may be moved temporally ahead of the command for turning on the TV. Subsequent tracking information may be collected to determine whether the Watch TV button and the help button are pressed in combination after the second configured for the set of command codes is used by the remote control. If these buttons are not longer pressed in combination, then the activity-based remote control, the host, and/or the remote database may determine that the issuance of the command to execute the second configuration has fixed the user's problem. If these buttons continued to be pressed in combination greater than the threshold number of time, then the activity-based remote control, the hose, and/or the remote database may issue further command to the remote control to use other configurations for issuance of the set of command codes.

According to another embodiment, if the tracking information is collected for combinations of button presses for an activity button and the help button, then options provided in a help menu may be rearranged in an attempt to provide the user with help information that may likely address the problem the user is experiencing. For example, if a given activity button and the help button are pressed in combination less than or equal to a threshold number of times, then a first order of help options may be presented on the screen, and if the given activity button and the help button are pressed in combination greater than a threshold number of times, then a second order of the help options may be presented on the screen where different help options may be emphasized to the user by presenting the given help option higher in a list of help options, for example, as compared to the first order of help options.

While particular embodiments and applications of the present invention have been illustrated and described, it is to be understood that the invention is not limited to the precise construction and components disclosed herein. Various other modifications, changes, and variations which will be apparent to those skilled in the art may be made in the arrangement, operation and details of the method and apparatus of the present invention disclosed herein, without departing from the spirit and scope of the invention as defined in the following claims.

What is claimed is:

1. A remote control comprising:

a screen configured to display a plurality of soft buttons in a first order, each soft button having a corresponding activity from a plurality of activities, at least one activity of the activities including presentation of content collectively by a plurality of consumer electronic devices and having a corresponding soft button that, when selected, causes each of the plurality of consumer electronic devices to change state; and a memory configured to store use information for the plurality of soft buttons wherein the use information includes a number of button presses for each of the plurality of soft buttons;

a processor configured to:

determine whether one of the plurality of soft buttons is pressed a number of times that exceeds a threshold number of times and that is greater than a number of times a second of the plurality of soft buttons is pressed, and, as a result of determining that the one of the plurality of soft buttons is pressed the number of times that exceeds the threshold number of times and that is greater than the number of times the second of the plurality of the plurality of soft buttons is pressed, to change the display of the plurality of soft buttons to a second order where the one of the plurality of soft buttons is displayed in the second order at a higher position than in the first order; and change the display of the plurality of first buttons based at least in part on use information of a second remote control.

2. The remote control of claim 1, further comprising a housing connected with the screen, the housing being configured to encourage a particular grip of the remote control by a human hand where the higher position is easier to touch than a lower position of the screen.

3. A remote control system comprising:

a first remote control having a screen configured to display a plurality of soft buttons in a first order and a second order, each of the soft buttons corresponding to a corresponding activity involving one or more consumer electronic devices controllable using the first remote control, at least one of the activities involving collective participation by a plurality of the consumer electronic devices in the activity, and wherein the first remote control is configured to collect tracking information for the soft buttons wherein the tracking information includes a number of button presses for each soft button;

a remote database configured to receive the tracking information from the first remote control, wherein the remote database is configured to determine whether one of the plurality of soft buttons is pressed a number of times that exceeds a threshold number of times and that is greater than a number of times a second of the plurality of soft buttons is pressed, and, based at least in part on the determination, send a command to the first remote control to change the display of the plurality of soft buttons from the first order to the second order where the one of the plurality of soft buttons is displayed in the second order at a higher position than in the first order; and a second remote control configured to change a display of soft buttons based at least in part on tracking information of the first remote control.

4. The remote control system of claim 3, further comprising:

a host computer configured to couple to the remote control to receive the tracking information from the remote control; and a network configured to receive the tracking information from the host and transfer the tracking information to the remote database.

5. The remote control system of claim 3, wherein the first remote control is configured for use by a plurality of users and displays the plurality of soft buttons on the screen in a unique configuration for each of the plurality of users based at least in part on tracking information for each of the plurality of users.

6. A remote control system comprising:

a first remote control having a screen configured to display a plurality of soft buttons in a first order and a second order, each of the soft buttons corresponding to a corresponding activity involving one or more consumer electronic devices controllable using the first remote control, at least one of the activities involving collective participation by a plurality of the consumer electronic devices in the activity, and wherein the first remote control is configured to collect tracking information for a subset of the plurality of soft buttons wherein the tracking information includes a number of button presses for each of the subset of the plurality of soft buttons;

a host configured to receive the tracking information from the first remote control, wherein the host is configured to determine whether one of the subset of the plurality of soft buttons is pressed a number of times that exceeds a threshold number of times and that is greater than a number of times a second of the subset of the plurality of soft buttons has been pressed, and, based at least in part on the determination, send a command to the remote control to change the display of the plurality of soft buttons from the first order to the second order where the one of the subset of the plurality of soft buttons is displayed in the second order at a higher position than in the first order; and a second remote control configured to change a display of soft buttons based at least in part on tracking information of the first remote control.

7. The remote control system of claim 6, wherein:

the host is further configured to send the command to the second remote control; and the second remote control is configured to change the display of soft buttons based at least in part on tracking information of the first remote control as a result of receiving the command from the host.

8. The remote control system of claim 6, wherein the first remote control comprises a housing connected with the screen, the housing being configured to encourage a particular grip of the remote control by a human hand where the higher position is easier to touch than a lower position of the screen.

9. A remote control facilitating blind navigation of a user's home-entertainment system, the remote control comprising:

a display;

a plurality of zones placed underneath the display, each zone comprising a plurality of buttons, wherein a most frequently used one of the plurality of zones is placed in an easily accessible location on the remote control, and wherein a most frequently used of the plurality of buttons for the most frequently used one of the plurality of zones is placed in a central location within the most frequently used one of the plurality of zones; and a processor configured to change the display of the plurality of first buttons based at least in part on use information of a second remote control.

10. The remote control of claim 9, further comprising a housing connected with the display, the housing being configured to encourage a particular grip of the remote control by a human hand where the easily accessible location is touchable by a finger of the human hand while engaged in the particular grip.

11. The remote control of claim 9, wherein the processor is further configured to track usage of the remote control and change the display of the plurality of buttons based at least in part on the tracked usage such that another button is placed in the central location when the other button is pressed a number of times that is greater than a threshold and becomes the most frequently used of the plurality of buttons.

12. A method for providing a user with an easily usable remote control, the method comprising:

providing a plurality of zones on a first remote control, the first remote control having a housing that is contoured to encourage a particular grip of the first remote control and each zone serving a specific purpose, each zone comprising a plurality of buttons;

placing the plurality of zones on the first remote control such that a more frequently used one of the plurality of zones is naturally touched by the user gripping the first remote control according to the encouraged particular grip;

placing the plurality of buttons within one of the plurality of zones such that the user can more easily access a more frequently used of the plurality of buttons;

formatting the plurality of buttons within the one of the plurality of zones such that the user can easily tactilely distinguish between the plurality of buttons; and adjusting a display of soft buttons on a second remote control based at least in part on use information of the first remote control.

13. The method of claim 12, wherein the step of formatting the plurality of buttons includes of one of shaping, sizing, and texturing the plurality of buttons.

14. The method of claim 12, further comprising:

collecting data relating to usage patterns to determine one of the more frequently used one of the plurality of zones and the more frequently used of the plurality of buttons.

15. The method of claim 14, wherein the step of collecting data comprising:

recording first data relating to frequency of usage of one of the plurality of zones from the remote control;

recording second data relating to frequency of usage of one of the plurality of buttons from the remote control; and transmitting the first and second data to a database.

16. A remote control system comprising:

a plurality of elements of a user interface, each of the elements corresponding to an activity involving one or more consumer electronic devices controllable using a first remote control, at least one of the activities involving collective participation by a plurality of the consumer electronic devices in the activity;

a processor configured to manipulate the plurality of the elements of the user interface, based at least in part upon usage information for a subset of the plurality of elements of the user interface indicating that the subset has been selected a number of times that is greater than a threshold and that is greater than a number of times a second subset of the plurality of elements has been pressed; and a communications module configured to send information to a second remote control for changing a display of a plurality of soft buttons on the second remote control based at least in part on the usage information of the first remote control.

17. The remote control system of claim 16, wherein the usage information includes a frequency of usage of each of the subset of the plurality of elements.

18. The remote control system of claim 16, further comprising a memory configured to store the usage information.

19. The remote control system of claim 16, wherein the processor is located on a remote server.

20. The remote control system of claim 16, wherein the processor is located on a local host.

* * * * *